United States Patent
Han et al.

(10) Patent No.: US 7,773,673 B2
(45) Date of Patent: Aug. 10, 2010

(54) METHOD AND APPARATUS FOR MOTION ESTIMATION USING ADAPTIVE SEARCH PATTERN FOR VIDEO SEQUENCE COMPRESSION

(75) Inventors: Kyu Seo Han, Daejeon (KR); Byung Tae Chun, Daejeon (KR); Jae Yeon Lee, Daejeon (KR); Yun Koo Chung, Daejeon (KR); Chieteuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1510 days.

(21) Appl. No.: 10/532,219

(22) PCT Filed: Oct. 13, 2003

(86) PCT No.: PCT/KR03/02104

§ 371 (c)(1),
(2), (4) Date: Apr. 22, 2005

(87) PCT Pub. No.: WO2004/039082

PCT Pub. Date: May 6, 2004

(65) Prior Publication Data
US 2006/0104358 A1 May 18, 2006

(30) Foreign Application Priority Data
Oct. 22, 2002 (KR) ............... 10-2002-0064520

(51) Int. Cl.
*H04N 7/18* (2006.01)
(52) U.S. Cl. ............... 375/240.16; 375/240.17
(58) Field of Classification Search ................ 375/240.01–240.29
See application file for complete search history.

(56) References Cited

U.S. PATENT DOCUMENTS

| 6,137,837 A | 10/2000 | Nemiroff et al. |
| 6,363,117 B1 | 3/2002 | Kok |
| 6,563,874 B1 * | 5/2003 | Lu ............... 375/240.12 |
| 6,567,469 B1 * | 5/2003 | Rackett ........... 375/240.16 |
| 6,842,483 B1 * | 1/2005 | Au et al. .......... 375/240.16 |
| 6,996,182 B2 * | 2/2006 | Ma ............... 375/240.16 |

OTHER PUBLICATIONS

Jo Yew Than, et al.; "Transactions Letters—A Novel Unrestricted Center-Biased Diamond Search Algorithm for Block Motion Esimation"; IEEE Transactions on Circuits and Systems for Video Technology, vol. 8; No. 4; Aug. 1998.
Lurng-Kui Liu, et al.; "A Block-Based Gradient Descent Search Algorithm for Block Motion Estimation in Video Coding"; IEEE Transactions on Circuits and Systems for Video Technology, vol. 6; No. 4; Aug. 1996.

* cited by examiner

*Primary Examiner*—Andy S Rao
(74) *Attorney, Agent, or Firm*—Lowe Hauptman Ham & Berner LLP

(57) ABSTRACT

In a method for motion estimation using adaptive patterns in a video sequence compression system, an initial search pattern located at a center of a search window in a block of a video frame is determined. A location of a minimum block distortion measure (BDM) is searched in the initial search pattern. A horizontal search pattern for functioning on the search window is determined in the horizontal direction to search a location of a minimum BDM in the horizontal search pattern. A vertical search pattern for operating on the search window is determined in the vertical direction to search a location of a minimum BDM in the vertical search pattern. The location of the minimum BDM in each pattern is designated to be a motion vector. A search pattern to be used in a subsequent searching stage is determined based on the location of the minimum BDM in each pattern.

8 Claims, 7 Drawing Sheets

METHOD AND APPARATUS FOR MOTION ESTIMATION USING ADAPTIVE SEARCH PATTERN FOR VIDEO SEQUENCE COMPRESSION

CROSS REFERENCE TO RELATED APPLICATION

This application is the National Phase application of International Application No. PCT/KR2003/002104, filed Oct. 13, 2003, which designates the United States and was published in English. This application, in its entirety, is incorporated herein by reference.

FIELD OF THE INVENTION

The present invention relates to a video sequence compression technique; and, more particularly, to a method and apparatus for motion estimation using adaptive search patterns for a video sequence compression, which is suitable for providing a better motion estimation precision and a higher computational efficiency in a motion compensation technique among compression technologies using a correlation between video frames.

BACKGROUND OF THE INVENTION

A motion compensation compression technique refers to a technology for removing a temporal redundancy between successive video frames by using a motion estimation technique. A block-based motion estimation technique has been adopted in a compression standard of a video sequence such as MPEG-4, H.263 and the like.

The block-based motion estimation technique is widely used even in case of another compression standard due to its facility of implementation in hardware and/or software.

In the block-based motion estimation technique, each video frame is divided into a plurality of blocks, wherein each of the blocks is associated with a motion vector to describe a location change between a block in a reference video frame and that of a current video frame corresponding to the block in the reference video frame. The motion vector can be obtained from the location change of most similar blocks in the two frames. In other words, based on a block distortion measure (BDM) for calculating similarity between blocks, a block having a minimum BDM value is selected.

However, a currently used block-based motion estimation technique is considered to require a great amount of computation and much time therefor. To be specific, a full search motion estimation regarded to be comparatively accurate calculates a mean absolute deviation for every block in a search window of a predetermined size and selects a block having a minimum value thereof to thereby obtain a motion vector. In this case, a computational amount for the motion vector occupies more than 70% of that for an entire video compression.

To that end, a plurality of fast block-based motion estimation techniques have been suggested. However, such techniques are sub-optimal and do not provide as high of accuracy as the full search motion estimation technique because of an error caused by an assumption for applying an estimation method.

SUMMARY OF THE INVENTION

It is, therefore, an object of the present invention to provide a motion estimation method and apparatus using adaptive search patterns of a video sequence compression system, which is computationally efficient and improves the accuracy of the full search motion estimation, wherein a search pattern is determined based on a result of a previous search process and a horizontal and a vertical search pattern are adaptively determined in each stage of the search process.

In accordance with one aspect of the invention, there is provided a method for motion estimation using adaptive patterns in a video sequence compression system, including the steps of: (a) determining an initial search pattern located at a center of a search window in a block of a video frame; (b) searching a location of a minimum block distortion measure (BDM) in the initial search pattern; (c) determining a horizontal search pattern for functioning on the search window in the horizontal direction to search a location of a minimum BDM in the horizontal search pattern; (d) determining a vertical search pattern for operating on the search window in the vertical direction to search a location of a minimum BDM in the vertical search pattern; (e) designating the location of the minimum BDM in the initial search pattern to be a motion vector; (f) designating the location of the minimum BDM in the horizontal search pattern to be a motion vector; (g) designating the location of the minimum BDM in the vertical search pattern to be a motion vector; (h) determining a search pattern to be used in a subsequent searching stage based on the location of the minimum BDM in the initial search pattern; (i) determining a search pattern to be used in a subsequent searching stage based on the location of the minimum BDM in the horizontal search pattern; and (j) determining a search pattern to be used in a subsequent searching stage based on the location of the minimum BDM in the vertical search pattern.

In accordance with another aspect of the invention, there is provided an apparatus for motion estimation using adaptive search patterns for a video sequence compression, including; a current image block generation means for generating a current image block; a previous image block generation means for generating a previous image block; a first and a second memory for storing image blocks generated by the current image block generation means and the previous image block generation means; and a pattern determination and motion estimation means for retrieving data of image block stored in the first and the second memory to search a location of a minimum BDM in a current search pattern of the data of the retrieved image block and determining a next search pattern to be used in a subsequent searching stage depending on the location of the minimum BDM.

BRIEF DESCRIPTION OF THE INVENTION

The above and other objects and features of the present invention will become apparent from the following description of preferred embodiments, given in conjunction with the accompanying drawings, in which.

DESCRIPTION OF SPECIFIC EMBODIMENTS

Hereinafter, preferred embodiments of the present invention will be described in detail with reference to the accompanying drawings.

The present invention is applied to a general video sequence compression technology and may be applicable to software for operating a circuit/computer or other devices capable of a video processing.

Figure 1:
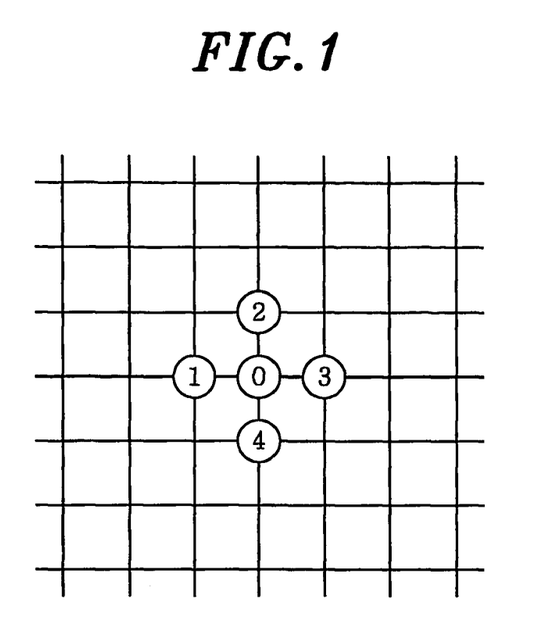
FIG. 1 shows an exemplary diagram of an initial search pattern employed in the present invention.
Figure 2:
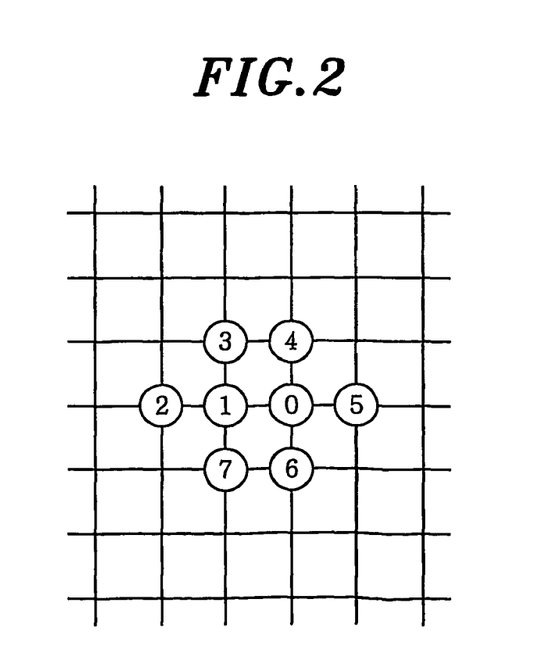
FIG. 2 illustrates an exemplary diagram of a horizontal search pattern employed in the present invention.
Figure 3:
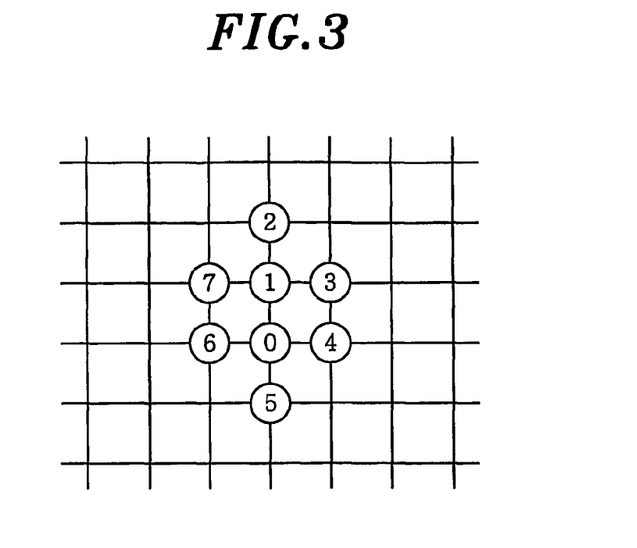
FIG. 3 provides an exemplary diagram of a vertical search pattern employed in the present invention.

FIGS. 1 to 3 illustrate examples of search patterns employed in the present invention.

FIG. 1 shows a case where an initial search pattern is located in a center of a search window so that an initial direction is determined.

To be specific, a block distortion measure (BDM) value is evaluated for each of five search locations, i.e., locations 0 to 4 of the initial search pattern. If a minimum BDM value is found to be at the location 0 thereof, no more search process is continued and a motion estimation process is ended. In this case, a motion vector (MV) is defined at (0, 0).

Meanwhile, if a minimum BDM value occurs at either the location 1 or 3 thereof, a horizontal search pattern illustrated in FIG. 2 is used in a next stage. In case a minimum BDM value corresponds to either the location 2 or 4 thereof, a vertical search pattern illustrated in FIG. 3 is used in the next stage.

The horizontal and the vertical search patterns shown in FIGS. 2 and 3 respectively have eight search locations. A motion vector is determined depending on the search locations, specifically, a location where the minimum BDM value occurs. If a minimum BDM value occurs at either a location 0 or 1 of the horizontal and the vertical search patterns, a motion vector is determined depending on the location where the minimum BDM value occurs. Then, the motion estimation process is ended.

In case a minimum BDM value is found at one of other locations of the horizontal and the vertical search patterns except the locations 0 and 1, a search pattern to be applied to a next stage is also determined depending on the location where the minimum BDM value is found.

Figure 4A:
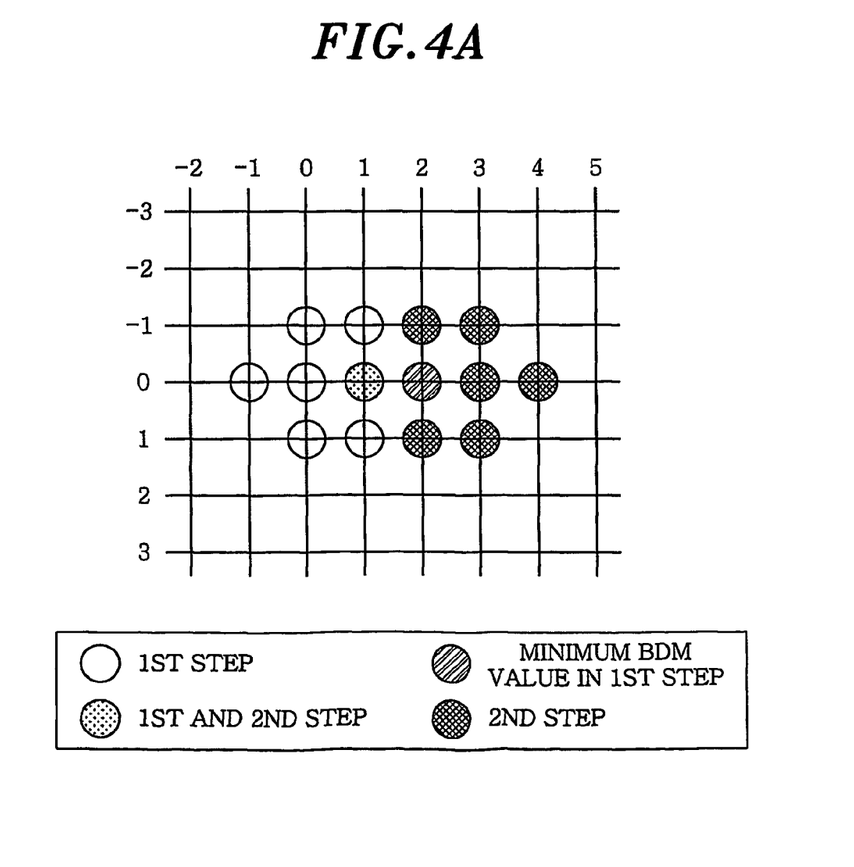
FIGS. 4A and 4B present examples of search determination patterns on a location basis in the horizontal search pattern employed in the present invention.

That is to say, if either a location 2 or 5 of the horizontal and the vertical search patterns has the minimum BDM value, the horizontal search pattern shown in FIG. 2 is again used in a next stage as shown in FIG. 4a.

To be more specific, if the minimum BDM value is found to be at the location 2 of the horizontal search pattern shown in FIG. 2, the location 2 is determined to be a location 0 of the horizontal search pattern to be used in the next stage. In case the minimum BDM value occurs at the location 5 of the horizontal search pattern shown in FIG. 2, the location 5 corresponds to the location 1 of the horizontal search pattern to be used in the next stage.

Meanwhile, in case where a minimum BDM value occurs at one of locations 3, 4, 6 or 7 of the horizontal search pattern shown in FIG. 2, a search pattern to be used in a next stage is determined to be the vertical search pattern shown in FIG. 3.

Figure 4B:
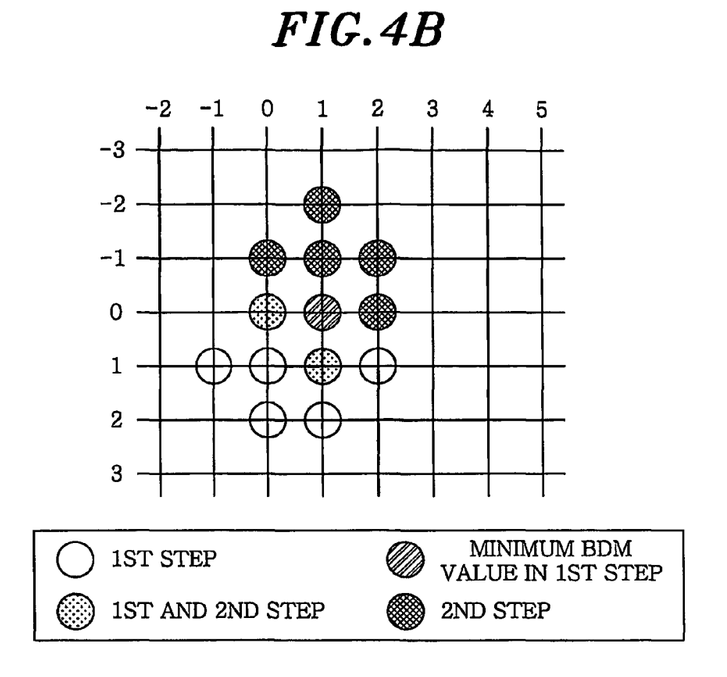

An example thereof is illustrated in FIG. 4B. In case a minimum BDM value is found at either the location 3 or 4 of the horizontal search pattern shown in FIG. 2, the location where the minimum BDM value is found is determined to be a location 0 of the vertical search pattern to be used in a next stage.

Besides, if a minimum BDM value is found to be at either the location 6 or 7 of the horizontal search pattern shown in FIG. 2, the location where the minimum BDM value is found is determined to be a location 1 of the vertical search pattern to be used in a next stage.

In case of the vertical search pattern shown in FIG. 3, if a minimum BDM value occurs at either a location 2 or 5, the vertical search pattern shown in FIG. 3 is again used in a next stage. On the other hand, if a minimum BDM value corresponds to one of locations 3, 4, 6 or 7 of the vertical search pattern shown in FIG. 3, the horizontal search pattern shown in FIG. 2 is used in a next stage.

For example, if a minimum BDM value occurs at the location 5 of the vertical search pattern shown in FIG. 3, the location 5 is determined to be the location 0 of the vertical search pattern to be used in a next stage. Further, if a minimum BDM value is at the location 2 of the vertical search pattern shown in FIG. 3, the location 2 is determined to be the location 1 of the vertical search pattern to be used in a next stage.

In case a minimum BDM value corresponds to either the location 3 or 4 of the vertical search pattern shown in FIG. 3, the location where the minimum BDM value is found is determined to be the location 1 of the horizontal search pattern to be used in the next stage. Besides, in case a minimum BDM value occurs at either the location 6 or 7 of the vertical search pattern shown in FIG. 3, the location where the minimum BDM value is found is determined to be the location 0 of the horizontal search pattern to be used in the next stage.

Figure 6:
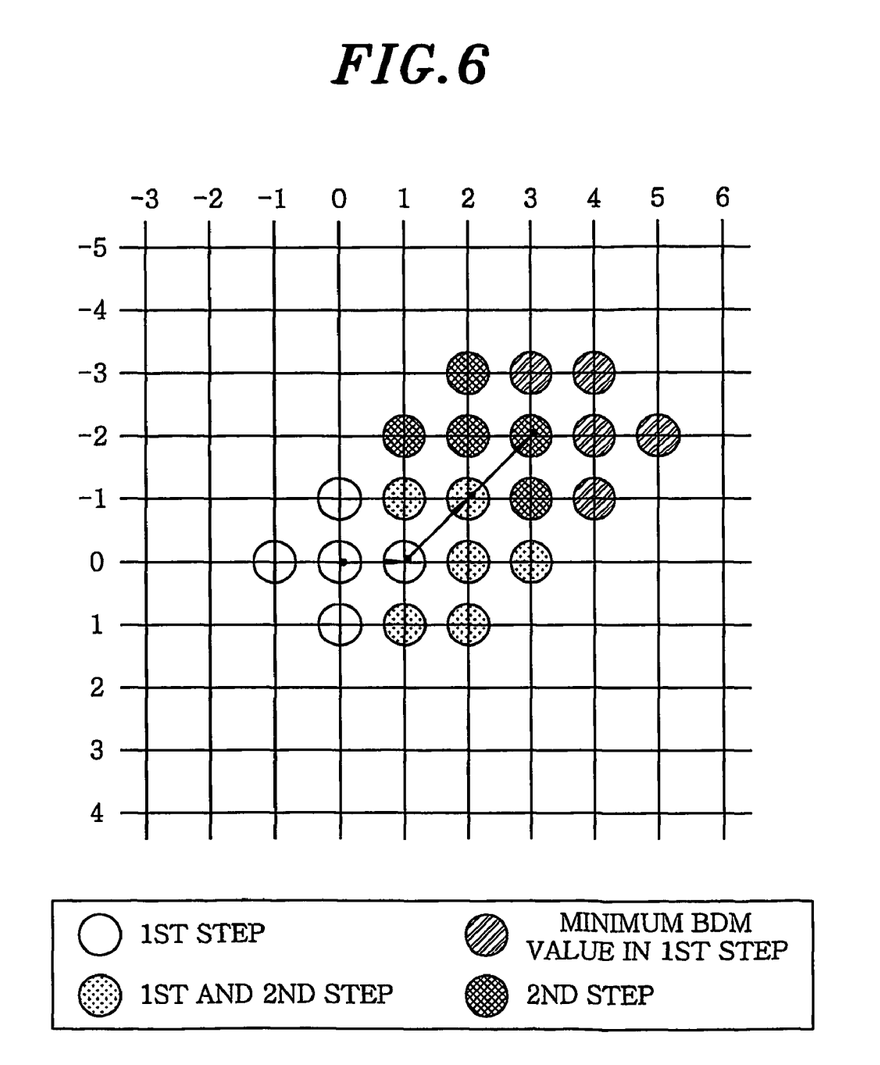
FIG. 6 offers an exemplary diagram for showing a search pattern applying a motion estimation method in accordance with a preferred embodiment of the present invention.

FIG. 6 offers an exemplary diagram for showing a search pattern in accordance with the present invention. Especially, there illustrated a case where a minimum BDM value is found to be at a location 3 in an initial search pattern as shown in FIG. 1.

In a first stage, a BDM value is evaluated for five locations of the initial search pattern.

As a result thereof, in a second stage, a location having a minimum BDM value, i.e., the location 3, is detected In a second stage, a horizontal search pattern as shown in FIG. 2 is used in a next stage, and the location 3 is determined to be the location 1 of the horizontal search pattern.

Meanwhile, the minimum BDM value exists at the location 4 of the horizontal search pattern, and therefore, a vertical search pattern as shown in FIG. 4B is used in a third stage.

Figure 5A:
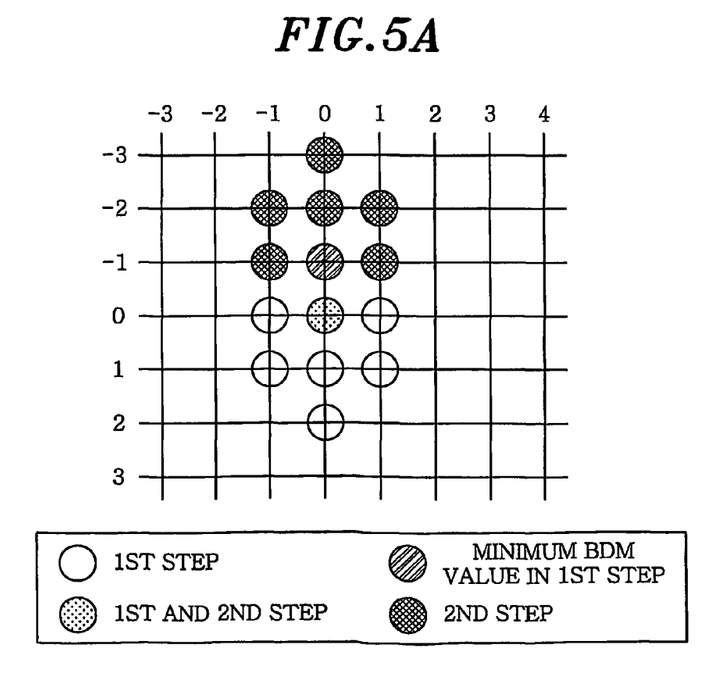
FIGS. 5A and 5B represent examples of search determination patterns on a location basis in the vertical search pattern employed in the present invention.
Figure 5B:
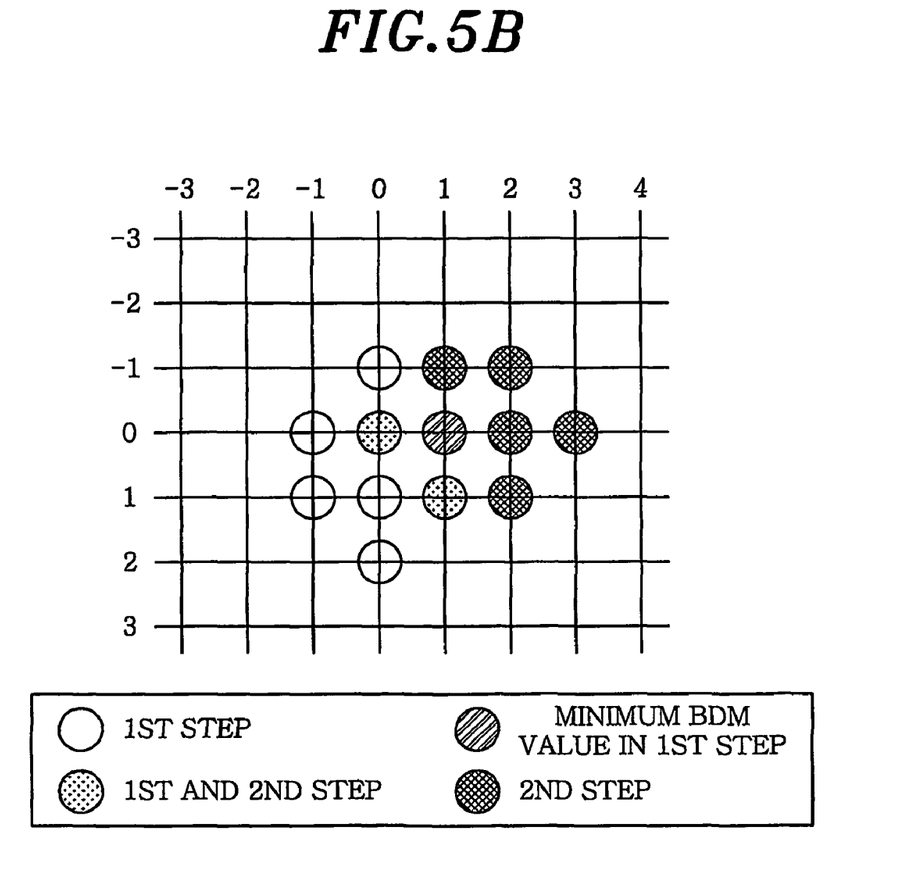

Further, since the minimum BDM value is at the location 3 of the vertical search pattern of the third stage, a horizontal search pattern as illustrated in FIG. 5B is used in a fourth stage.

In a fifth stage, the minimum BDM value is found to be at a location 0 of the horizontal search pattern, so that the motion estimation process is ended, and finally, a final motion vector is determined to be at (3, −2).

Figure 7:
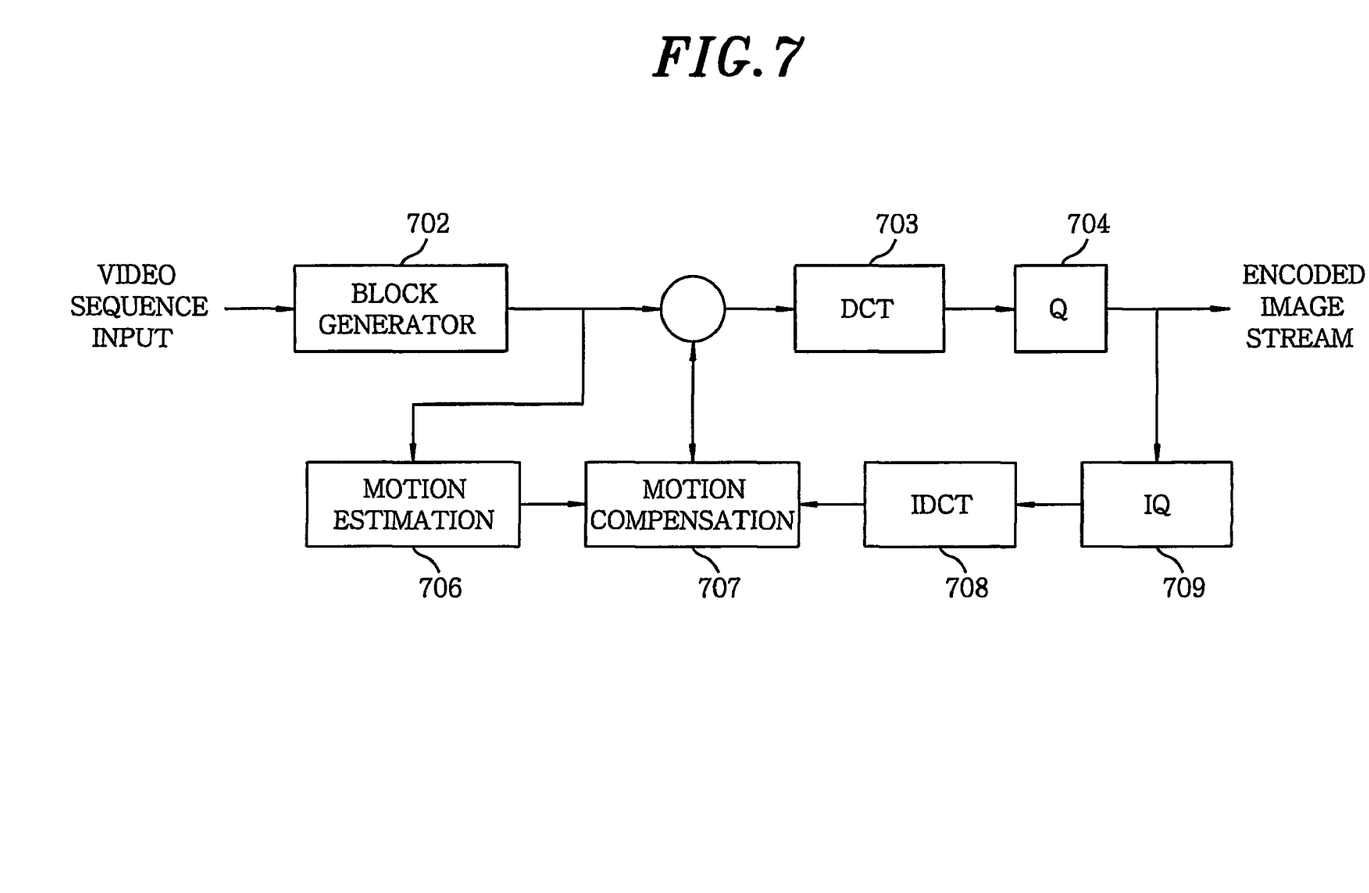
FIG. 7 describes a block diagram of a video encoder employed in the present invention.

FIG. 7 describes a block diagram of a video encoder employing the motion estimation method in accordance with the present invention, wherein the video encoder includes a block generation unit 702, a DCT conversion unit 703, a quantization unit 704, a motion estimation unit 706, a motion compensation unit 707, an inverse DCT conversion unit 708 and an inverse quantization unit 709.

The block generation unit 702 divides each frame in a video sequence into blocks of a regular size, e.g., 8×8.

Each of the blocks generated by the block generation unit 702 is provided to the motion estimation unit 706 and the motion compensation unit 707, so that the motion compensation is performed.

The DCT conversion unit 703 performs a DCT conversion on the block in which the motion compensation is carried out by the motion compensation unit 707. The quantization unit 704 quantizes the DCT converted block, to thereby output a quantized encoding stream.

Further, the inverse DCT conversion unit 708 and the inverse quantization unit 709 are utilized for using a correlation between frames in the video encoder of FIG. 7.

Various motion estimation algorithms are applied to the motion estimation unit 706. The video encoder including the motion estimation unit 706 performs motion estimation by using the method described in FIGS. 1 to 5.

Figure 8:
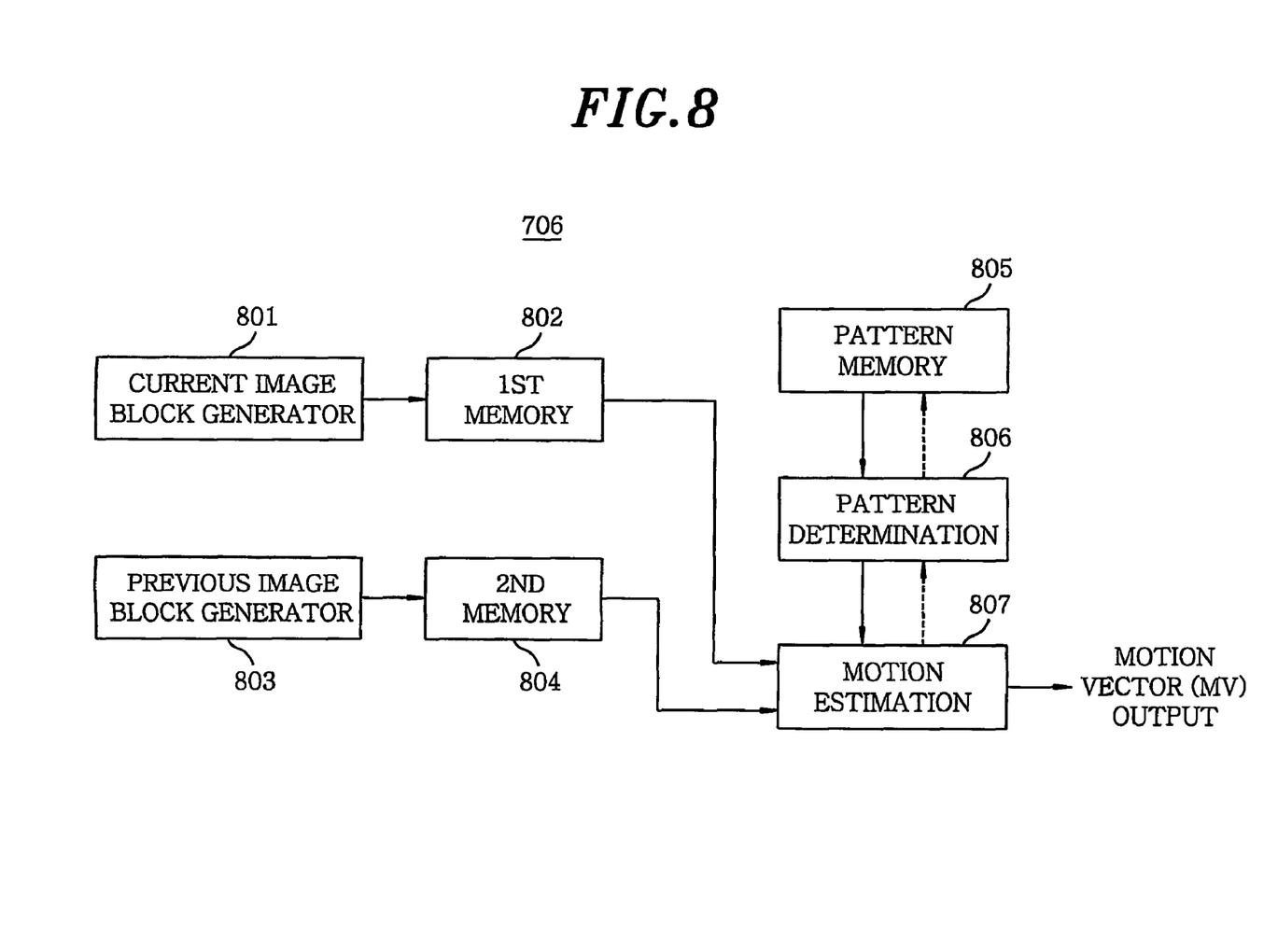
FIG. 8 sets forth a detailed block diagram of a motion estimation unit of FIG. 7 in accordance with another preferred embodiment of the present invention.

FIG. 8 sets forth a detailed block diagram of the motion estimation unit 706 of FIG. 7, wherein the motion estimation unit 706 includes a current frame block generation unit 801, a previous frame block generation unit 803, a first and a second memory 802 and 804, a pattern memory 805, a pattern determination unit 806 and a motion estimation unit 807. A solid line in FIG. 8 indicates a data signal flow and a dotted line therein represents an actuating signal flow.

As illustrated in FIG. 8, the current image block generation unit 801 and the previous image block generation unit 803 generate image blocks to be used in the motion estimation unit 807 and then send the generated blocks to the first and the second memory 802 and 804.

The first and the second memory 802 and 804 respectively store the image blocks transmitted from the current image block generation unit 801 and the previous image block generation unit 803 and then send the stored image blocks to the motion estimation unit 807.

Based on data of the transmitted block, the motion estimation unit 807 performs a motion estimation process by using patterns in accordance with the present invention as described above.

In other words, the motion estimation unit 807 sends an actuating signal to the pattern determination unit 806 and the pattern determination unit 806 provides the actuating signal to the pattern memory 805. Thus, the pattern memory 805 receives search patterns described in FIGS. 1 to 3.

The search patterns transmitted to the pattern memory unit 805 are provided to the motion estimation unit 807 again to thereby be used for a search process.

Depending on a result of the search process performed by using the transmitted search patterns, the motion estimation unit 807 sends search patterns to be used in a next stage to the pattern determination unit 806 and the pattern memory unit 805 through the actuating signal, so that the above-described processes are repeated.

If the minimum BDM value is found to be at the location 0 or 1 of FIGS. 2 and 3 thereby ending the motion estimation process, a motion vector MV depending on the above-mentioned search locations is outputted.

The present invention is able to provide a computationally efficient motion estimation method and avoid a convergence to a location minimum value that may occur during the search process.

While the invention has been shown and described with respect to the preferred embodiments, it will be understood by those skilled in the art that various changes and modifications may be made without departing from the spirit and scope of the invention as defined in the following claims.

The invention claimed is:

1. A method for motion estimation using adaptive patterns in a video sequence compression system, said method comprising the steps of:
  (a) defining, by a motion estimation apparatus, an initial search pattern located at a center of a search window in a block of a video frame;
  (b) searching, by the motion estimation apparatus, for a location of a minimum block distortion measure (BDM) in the initial search pattern;
  (c) based on the location of the minimum BDM in the initial search pattern or a current search pattern, determining, by the motion estimation apparatus, whether a horizontal search pattern, which is elongated in a horizontal direction of the search window, or a vertical search pattern, which is elongated in a vertical direction of the search window, is to be used as a subsequent search pattern;
  (d) defining, by the motion estimation apparatus, the subsequent search pattern in the search window, wherein the subsequent search pattern is the horizontal or vertical search pattern as determined in step (c) and wherein the minimum BDM of the initial or current search pattern is positioned at one among a plurality of central locations of the subsequent search pattern;
  (e) searching, by the motion estimation apparatus, for a location of a minimum BDM in the subsequent search pattern defined in step (d);
  (f) repeating, by the motion estimation apparatus, steps (c)-(e) until the location of the minimum BDM of the subsequent search pattern falls in one of the central locations thereof;
  (g) designating, by the motion estimation apparatus, the locations of the minimum BDMs found in steps (b) and (e) as motion vectors; and
  (h) outputting, by the motion estimation apparatus, the motion vectors from said motion estimation apparatus.

2. The method of claim 1, wherein
the central locations of each of the horizontal and vertical search patterns comprise first and second central location; and
the horizontal search pattern further comprises, besides the respective central locations, first through fourth peripheral locations, wherein
if the minimum BDM falls on the first peripheral location, said first peripheral location will become the first central location of the subsequent, horizontal search pattern,
if the minimum BDM falls on the second peripheral location, said second peripheral location will become the second central location of the subsequent, horizontal search pattern,
if the minimum BDM falls on the third peripheral location, said third peripheral location will become the first central location of the subsequent, vertical search pattern, and
if the minimum BDM falls on the fourth peripheral location, said fourth peripheral location will become the second central location of the subsequent, vertical search pattern.

3. The method of claim 1, wherein the locations that belong to both the current and subsequent search patterns are excluded in the determination of the minimum BDM of the subsequent search pattern.

4. The method of claim 1, wherein
the initial search pattern includes 4n+1 search locations comprising
a single central location, and 2n locations in each of the vertical and the horizontal directions from said central location;

the horizontal search pattern is hexagonal and includes 8n search locations comprising
2n locations in a top row,
4n locations in a middle row, and
2n locations in a bottom row; and the vertical search pattern is hexagonal and includes 8n search locations comprising
2n locations in a left side column,
4n locations in a middle column, and
2n locations in a right side column;

where n is a positive integer.

5. The method of claim 4, wherein the vertical search pattern is to be used as the subsequent search pattern in case the minimum BDM of the initial search pattern occurs at one of the 2n search locations in each of the top and bottom rows;

the horizontal search pattern is to be used as the subsequent search pattern in case the minimum BDM of the initial search pattern is found at one of the 2n search locations in each of the left and right side columns; and the search process ends in case the minimum BDM of the initial search pattern corresponds to the central location.

6. The method of claim 5, wherein, when the current search pattern is the horizontal search pattern, the search process ends in case the minimum BDM occurs at one of 2n central locations the middle row;

the horizontal search pattern is determined to be used again as the subsequent search pattern in case the minimum BDM is found at one of the 2n search locations of the middle row on either side of the 2n central locations; and the vertical search pattern is determined to be used as the subsequent search pattern in case the minimum BDM is at one of the 4n search locations in the top and bottom rows.

7. The method of claim 6, wherein, when the current search pattern is the vertical search pattern, the search process ends in case the minimum BDM occurs at one of 2n central locations in the middle column;

the vertical search pattern is determined to be used again as the subsequent search pattern in case the minimum BDM is found at one of the 2n search locations of the middle column above or below the 2n central locations; and the horizontal search pattern is determined to be used as the subsequent search pattern in case the minimum BDM is at one of the 4n search locations in the left and right columns.

8. An apparatus for motion estimation using adaptive search patterns for a video sequence compression, said apparatus comprising:

a current image block generation unit for generating a current image block;

a previous image block generation unit for generating a previous image block;

first and second memories for storing the image blocks generated by the current image block generation unit and the previous image block generation unit; and a pattern determination and motion estimation unit for retrieving data of image block stored in the first and the second memory for performing the following steps:

(a) defining an initial search pattern located at a center of a search window in a block of a video frame;

(b) searching for a location of a minimum block distortion measure (BDM) in the initial search pattern;

(c) based on the location of the minimum BDM in the initial search pattern or a current search pattern, determining whether a horizontal search pattern, which is elongated in a horizontal direction of the search window, or a vertical search pattern, which is elongated in a vertical direction of the search window, is to be used as a subsequent search pattern;

(d) defining the subsequent search pattern in the search window, wherein the subsequent search pattern is the horizontal or vertical search pattern as determined in step (c) and wherein the minimum BDM of the initial or current search pattern is positioned at one among a plurality of central locations of the subsequent search pattern;

(e) searching for a location of a minimum BDM in the subsequent search pattern defined in step (d);

(f) repeating steps (c)-(e) until the location of the minimum BDM of the subsequent search pattern falls in one of the central locations thereof;

(g) designating the locations of the minimum BDMs found in steps (b) and (e) as motion vectors; and (h) outputting the motion vectors from said motion estimation apparatus.

* * * * *